United States Patent
Choi et al.

(10) Patent No.: US 11,334,200 B2
(45) Date of Patent: May 17, 2022

(54) TOUCH SENSING DEVICE FOR IMPLEMENTING HIGH RESOLUTION AND DISPLAY APPARATUS INCLUDING THE SAME

(71) Applicant: SILICON WORKS CO., LTD., Daejeon (KR)

(72) Inventors: Jung Min Choi, Daejeon (KR); Moon Ho Jang, Daejeon (KR); Bang Sik Dong, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 100 days.

(21) Appl. No.: 16/710,421

(22) Filed: Dec. 11, 2019

(65) Prior Publication Data

US 2020/0201480 A1  Jun. 25, 2020

(30) Foreign Application Priority Data

Dec. 20, 2018 (KR) .................. 10-2018-0165949

(51) Int. Cl.
*G06F 3/044* (2006.01)
*G06F 3/0354* (2013.01)

(52) U.S. Cl.
CPC ........ *G06F 3/0442* (2019.05); *G06F 3/03545* (2013.01); *G06F 2203/04114* (2019.05)

(58) Field of Classification Search
CPC .............. G06F 3/0442; G06F 3/03545; G06F 2203/04114
See application file for complete search history.

(56) References Cited

U.S. PATENT DOCUMENTS

| | | | |
|---|---|---|---|
| 2015/0277609 A1* | 10/2015 | Jung .................. | G06F 3/041661 345/173 |
| 2018/0188836 A1* | 7/2018 | Park ...................... | G06F 3/0442 |
| 2019/0179475 A1* | 6/2019 | Seo ........................ | G06F 3/0383 |
| 2021/0055829 A1* | 2/2021 | Miyamoto ............ | G06F 3/0441 |

FOREIGN PATENT DOCUMENTS

| KR | 10-2018-0041305 A | 4/2018 |
|---|---|---|
| KR | 10-2018-0079586 A | 7/2018 |

* cited by examiner

*Primary Examiner* — Stephen G Sherman
(74) *Attorney, Agent, or Firm* — Harness, Dickey & Pierce, P.L.C.

(57) ABSTRACT

Disclosed is a touch sensing device for implementing a high resolution, which decreases a touch sensing period of an active pen in one frame to increase a display period. The touch sensing device includes a touch driver transmitting an uplink signal to an active pen through a touch electrode provided in a display panel during a first touch sensing period included in one frame period, a touch sensing unit sensing a downlink signal transmitted from the active pen on the basis of a capacitance occurring between the active pen and the touch electrode to generate first sensing data during a plurality of second touch sensing periods included in the one frame period, and a touch controller calculating pen data and pen touch coordinates of the active pen on the basis of the first sensing data generated during the second touch sensing period.

19 Claims, 5 Drawing Sheets

| TOUCH FRAME | | | | | | | | | | | | | | | |
|---|---|---|---|---|---|---|---|---|---|---|---|---|---|---|---|
| 1LHB | 2LHB | 3LHB | 4LHB | 5LHB | 6LHB | 7LHB | 8LHB | 9LHB | 10LHB | 11LHB | 12LHB | 13LHB | 14LHB | 15LHB | 16LHB |
| Beacon | Pen | Finger 1 | Data1 | Finger 2 | Pen | Finger 3 | Data2 | Data3 | Pen | Finger 4 | Data4 | Data5 | Pen | Finger 5 | Finger 6 |

FIG. 1

TOUCH SENSING DEVICE FOR IMPLEMENTING HIGH RESOLUTION AND DISPLAY APPARATUS INCLUDING THE SAME

CROSS-REFERENCE TO RELATED APPLICATIONS

This application claims the benefit of the Korean Patent Application No. 10-2018-0165949 filed on Dec. 20, 2018, which is hereby incorporated by reference as if fully set forth herein.

FIELD

The present disclosure relates to a touch sensing device, and more particularly, to a touch sensing device for sensing a touch based on an active pen.

BACKGROUND

Recently, stylus pens as well as fingers are being used as an input device for various display apparatuses. Comparing with a finger, the stylus pens enable a more precise input. The stylus pens are categorized into a passive type and an active type.

In case of a passive type pen (hereinafter referred to as a passive pen), capacitance variation occurring at a contact point between the passive pen and a touch screen is small, and due to this, is difficult to detect a touch position. On the other hand, an active type pen (hereinafter referred to as an active pen) generates a pen driving signal autonomously and outputs the generated pen driving signal to a contact point between the active pen and a touch screen, and thus, comparing with the passive pen, the active pen is easy to detect a touch position, whereby the use of the active pen is increasing.

FIG. 1 illustrates a touch frame of a general touch sensing device enabling a touch of an active pen to be sensed. The touch frame illustrated in FIG. 1 denotes a period, where touch sensing is performed, of one frame.

Long horizontal blanking (LHB) illustrated in FIG. 1 represents a touch sensing period where touch sensing is performed on a finger or the active pen in one frame, and a touch frame may include a plurality of LHB (for example, LHB1 to LHB16). As illustrated in FIG. 1, the general touch sensing device senses a finger touch during a plurality of LHB (for example, 3LHB, 5LHB, 7LHB, 11LHB, 15LHB, and 16LHB), senses pen data of the active pen during a plurality of LHB (for example, 4LHB, 8LHB, 9LHB, 12LHB, and 13LHB), and senses pen touch coordinates of the active pen during a plurality of LHB (for example, 2LHB, 6LHB, 10LHB, and 14LHB).

That is, it may be seen that the general touch sensing device individually senses pen data and pen touch coordinates through separate touch sensing periods. In the general touch sensing device, since the pen data and the pen touch coordinates are individually sensed through the separate touch sensing periods, there is a problem where the touch sensing period increases inevitably.

Particularly, in an in-cell type display apparatus where touch electrodes are embedded into a pixel array of a display panel, the display apparatus is time-divisionally driven in a display period and the touch sensing period, and thus, the display period is needed to increase, for implementing a high-resolution display apparatus. However, in the general touch sensing device illustrated in FIG. 1, since the pen data and the pen touch coordinates of the active pen are sensed through the separate touch sensing periods, the display period is difficult to increase, and due to this, there is a limitation in that it is difficult to implement the active pen in the high-resolution display apparatus.

SUMMARY

Accordingly, the present disclosure is directed to providing a touch sensing device that substantially obviates one or more problems due to limitations and disadvantages of the related art.

An aspect of the present invention is directed to providing a touch sensing device for implementing a high resolution and a display apparatus including the same, which decrease a touch sensing period of an active pen in one frame to increase a display period.

Another aspect of the present invention is directed to providing a touch sensing device for implementing a high resolution and a display apparatus including the same, which simultaneously sense pen data and pen touch coordinates of an active pen in the same touch sensing period.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a touch sensing device for implementing a high resolution, the touch sensing device including: a touch driver transmitting an uplink signal to an active pen through a touch electrode provided in a display panel during a first touch sensing period included in one frame period; a touch sensing unit sensing a downlink signal transmitted from the active pen on the basis of a capacitance occurring between the active pen and the touch electrode to generate first sensing data during a plurality of second touch sensing periods included in the one frame period; and a touch controller calculating pen data and pen touch coordinates of the active pen on the basis of the first sensing data generated during the second touch sensing period.

In another aspect of the present disclosure, there is provided a display apparatus including: a display panel including a plurality of touch electrodes; and a touch sensing device transmitting an uplink signal to an active pen through the touch electrode during a first touch sensing period included in one frame period and sensing a downlink signal transmitted from the active pen on the basis of a capacitance generated between the active pen and the touch electrode to calculate pen data and pen touch coordinates of the active pen during a plurality of second touch sensing periods included in the one frame period.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 1 is a diagram illustrating a touch frame of a general touch sensing device;

DETAILED DESCRIPTION

Figure 2:
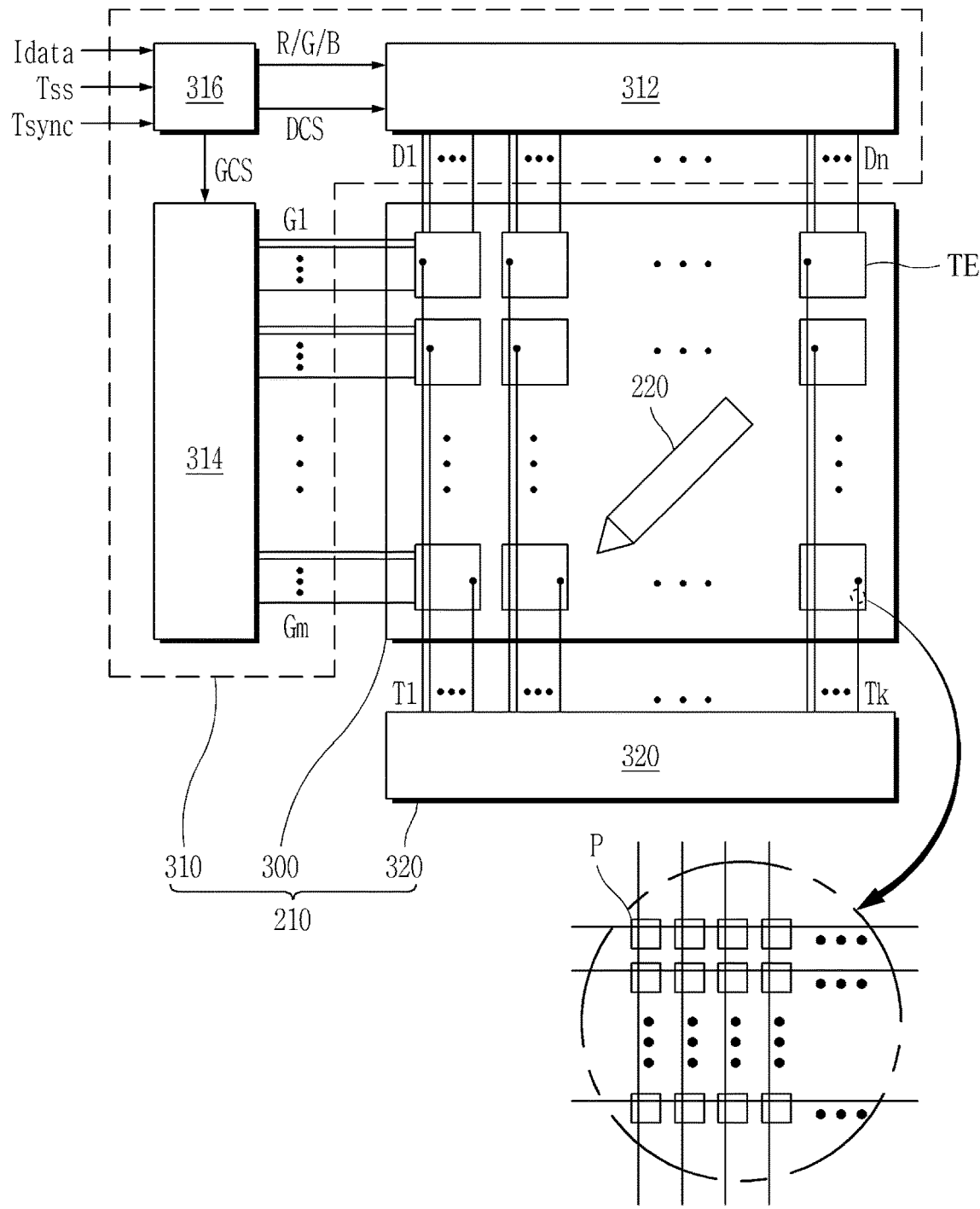
FIG. 2 is a diagram illustrating a configuration of a display apparatus according to an embodiment of the present invention.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

An X axis direction, a Y axis direction, and a Z axis direction should not be construed as only a geometric relationship where a relationship therebetween is vertical, and may denote having a broader directionality within a scope where elements of the present disclosure operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present invention will be described in detail with reference to the accompanying drawings.

FIG. 2 is a diagram illustrating a configuration of a display system according to an embodiment of the present invention. As illustrated in FIG. 2, the display system 200 according to an embodiment of the present invention may include a display apparatus 210 and an active pen 220.

The display apparatus 210 may perform a display function and a touch sensing function and may be implemented as a flat display apparatus such as a liquid crystal display (LCD) apparatus or an organic light emitting diode (OLED) display apparatus.

The display apparatus 210 according to the present invention may include a capacitive touch screen which is implemented as one body therein so as to sense a touch performed by a conductive object such as the active pen 220 or a finger. In an embodiment, the touch screen may be configured as a type independent from a display panel, or may be embedded into a pixel array of the display panel.

Particularly, the display apparatus 210 according to the present invention may sense, in one touch sensing period, pen data and pen touch coordinates which are generated by the active pen 220 when a touch based on the active pen 220 occurs, and thus, may decrease a touch sensing period of one frame.

A detailed description of a configuration of the display apparatus 210 will be described below with reference to FIGS. 2 to 5.

The active pen 220 may generate a downlink signal including pen data in synchronization with an uplink signal received from the display apparatus 210 and may output the downlink signal to a contact point of the touch screen. In an embodiment, the active pen 220 may modulate the downlink signal by using a binary phase shift keying (BPSK) scheme or a differential binary phase shift keying (DBPSK) scheme and may output a modulated downlink signal to the touch screen.

Particularly, in the present invention, since the display apparatus 210 simultaneously senses pen data and pen touch coordinates generated by the active pen 220 in one touch sensing period, the active pen 220 may merely generate only a downlink signal for generating the pen data and output the downlink signal to the touch screen, but may not generate a separate downlink signal for sensing the pen touch coordinates.

In an embodiment, the pen data may include pen pressure information representing pressure of when the active pen 220 contacts the touch screen, button state information representing the activation or not of one or more functional buttons which are included in the active pen 220 and perform a specific function, pen identification information for differentiating the active pen 220 from another active pen, pen slope information representing a slope of the active pen 220, and removing information representing whether to remove content input by the active pen 220.

Hereinafter, a display apparatus according to the present invention will be described in more detail with reference to FIGS. 2 to 5.

FIG. 2 is a diagram illustrating a configuration of the display apparatus according to an embodiment of the present invention. As illustrated in FIG. 2, the display apparatus 210 according to an embodiment of the present invention may include a display panel 300, a panel driving device 310, and a touch sensing device 320.

The display panel 300 may display an image having a certain gray level, or may receive a touch based on a finger or the active pen 220. The display panel 300 may be a display panel having a structure of an in-cell touch type using a capacitance type. In an embodiment, the display panel 300 may be an in-cell touch type display panel using a self-capacitance type or an in-cell touch type display panel using a mutual-capacitance type. Hereinafter, for convenience of description, an example where the display panel 300 is an in-cell touch type display panel using the self-capacitance type will be described.

The display panel 300 may operate in a display mode and a touch sensing mode. The display panel 300 may display an image by using light irradiated from a backlight unit during the display mode, and during the touch sensing mode, may act as a touch panel for touch sensing.

Figure 3A:
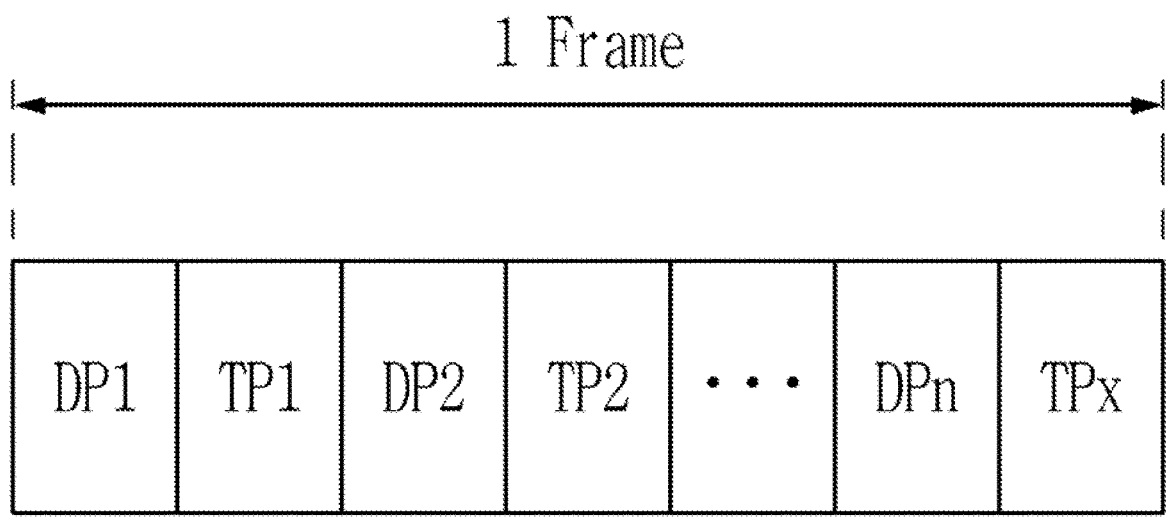
FIG. 3A is a diagram illustrating one frame period including a plurality of display periods and a plurality of touch sensing periods.

In an embodiment, as illustrated in FIG. 3A, the display mode may be performed in each of a plurality of display periods DP1 to DPn (where n is an integer of 2 or more) set in one frame, and the touch sensing mode may be performed in each of a plurality of touch sensing periods TP1 to TPx (where x is an integer of 2 or more) each set between two adjacent display periods of the plurality of display periods DP1 to DPn in one frame. In this case, in order to implement a high resolution, the number of display periods DP1 to DPn may be set to be more than the number of touch sensing periods TP1 to TPx, or a length of each of the display periods DP1 to DPn may be set to be longer than a length of each of the touch sensing periods TP1 to TPx.

Figure 3B:
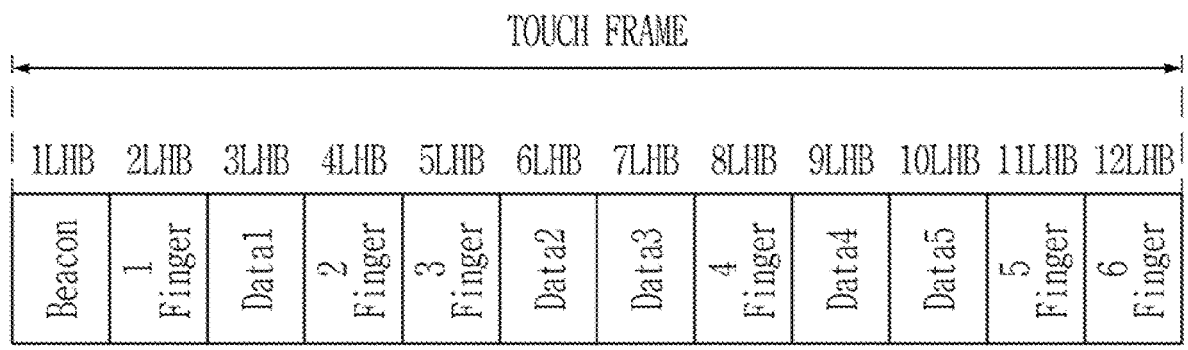
FIG. 3B is a diagram illustrating a configuration of a touch frame according to an embodiment of the present invention.

Particularly, in the present invention, when one frame is divided into twelve touch sensing periods TP1 to TP12, as illustrated in FIG. 3B, the touch sensing periods TP1 to TP12 may include a first touch sensing period 1LHB for transferring the uplink signal, a plurality of second touch sensing periods 3LHB, 6LHB, 7LHB, 9LHB, and 10LHB for sensing a touch based on the active pen 220, and a plurality of third touch sensing periods 2LHB, 4LHB, 5LHB, 8LHB, 11LHB, and 12LHB for sensing a finger touch. According to such an embodiment, during the second touch sensing periods 3LHB, 6LHB, 7LHB, 9LHB, and 10LHB, a touch driving signal or the uplink signal may not be supplied to the display panel 300, and thus, the display panel 300 may be maintained in a non-driving state.

In FIG. 3B, it is illustrated that one frame includes twelve touch sensing periods, but this is merely an embodiment. In other embodiments, one frame may include twelve or more touch sensing periods, or may include twelve or less touch sensing periods.

Hereinafter, for convenience of description, TT1 may refer to a first touch sensing period, TT2 may refer to a second touch sensing period, and TT3 may refer to a third touch sensing period.

The display panel 300 may include a plurality of data lines D1 to Dn, a plurality of gate lines G1 to Gm, a plurality of pixels P, a plurality of touch electrodes TE, and a plurality of touch lines T1 to Tk (where k is an integer of 2 or more).

In the display mode, each of the plurality of data lines D1 to Dn may receive a data signal. In the display mode, each of the plurality of gate lines G1 to Gm may receive a scan pulse. The plurality of data lines D1 to Dn and the plurality of gate lines G1 to Gm may be provided on a substrate to intersect, thereby defining a plurality of pixel areas. Each of the plurality of pixels P may include a thin film transistor (TFT) (not shown) connected to a gate line and a data line adjacent thereto, a pixel electrode (not shown) connected to the TFT, and a storage capacitor (not shown) connected to the pixel electrode.

The TFT may include a gate terminal, a semiconductor layer, a first terminal, and a second terminal. The first terminal and the second terminal of the TFT may each be defined as a source terminal or a drain terminal on the basis of a direction of a current. The TFT may have a bottom gate structure where the gate terminal is disposed under the semiconductor layer, or may have a top gate structure where the gate terminal is disposed on the semiconductor layer. The TFT may be covered by a passivation layer (or a planarization layer).

The pixel electrode may be formed of a transparent conductive material on the passivation layer in a pixel area and may be connected to the second terminal of the TFT through a via hole provided in the passivation layer.

The storage capacitor may be provided between the second terminal of the TFT and a corresponding touch electrode TE, or may be provided between the pixel electrode and the touch electrode TE. The storage capacitor may be charged with a voltage corresponding to a data signal supplied through the TFT, and when the TFT is turned off, the storage capacitor may hold an electric field which is generated between the pixel electrode and the touch electrode TE by using a charged voltage.

Each of the plurality of touch electrodes TE may act as a touch sensor for sensing a touch based on a finger or the active pen 220, or may act as a common electrode which generates an electric field along with the pixel electrode to drive liquid crystal. That is, each of the plurality of touch electrodes TE may be used as the touch sensor in the touch sensing mode, and in the display mode, may be used as the common electrode. Each of the plurality of touch electrodes TE may be used as the common electrode for driving the liquid crystal, and thus, may be made of a transparent conductive material.

In the touch sensing mode, each of the plurality of touch electrodes TE may be used as a self-capacitance type touch sensor, and thus, may have a size which is greater than a minimum contact size between a touch object and the display panel 300. Therefore, each of the plurality of touch electrodes TE may have a size corresponding to one or more pixels P. In an embodiment, the plurality of touch electrodes TE may be arranged at predetermined intervals along a plurality of horizontal lines and a plurality of vertical lines. For example, one horizontal line may include eighty-four touch electrodes TE arranged at predetermined intervals, and one vertical line may include forty-eight touch electrodes TE arranged at predetermined intervals.

Each of the plurality of touch lines T1 to Tk may be individually connected to a corresponding touch electrode of the plurality of touch electrodes TE. During the display periods DP1 to DPn in one frame period illustrated in FIG. 3A, each of the plurality of touch lines T1 to Tk may provide a common voltage Vcom to a corresponding touch electrode TE.

Moreover, as illustrated in FIG. 3B, during a first touch sensing period TT1 of one frame period, each of the plurality of touch lines T1 to Tk may provide the uplink signal through a corresponding touch electrode TE. Also, during a plurality of second touch sensing periods TT2 of the one frame period, each of the plurality of touch lines T1 to Tk may provide the touch sensing device 320 with a capacitance which is generated in a corresponding touch electrode TE on the basis of the downlink signal transferred from the active pen 220. Also, during a plurality of third touch sensing periods TT3 of the one frame period, each of the plurality of touch lines T1 to Tk may provide a corresponding touch electrode TE with the touch driving signal and may provide the touch sensing device 320 with a capacitance which is generated in the corresponding touch electrode TE on the basis of a finger touch.

Referring again to FIG. 2, during the display periods DP1 to DPn, the panel driving device 310 may allow data signals to be supplied to the plurality of pixels P included in the display panel 300, thereby allowing the display panel 300 to display an image. In an embodiment, the panel driving device 310 may include a data driver 312, a gate driver 314, and a timing controller 316.

During the display period, the data driver 312 may convert pixel data R/G/B into analog data signals on the basis of a data control signal DCS and may supply the analog data signals to the pixels P through the plurality of data lines D1 to Dn.

In an embodiment, during the plurality of third touch sensing periods TT3 where a finger touch is sensed, the data driver 312 may supply a data load free signal to each of the plurality of data lines D1 to Dn overlapping a touch electrode TE provided with the touch driving signal. The data load free signal may be a signal having the same phase as that of the touch driving signal which is applied to the touch electrode TE during the plurality of third touch sensing periods TT3. As described above, the data driver 312 may supply the data load free signal, having the same phase as that of the touch driving signal, to the plurality of data lines D1 to Dn overlapping the touch electrode TE provided with the touch driving signal, and thus, may decrease loads of touch electrodes TE caused by parasitic capacitances between the touch electrode TE and the data lines D1 to Dn, thereby enhancing touch sensitivity.

The gate driver 314 may generate the scan pulse in a predetermined order on the basis of a gate control signal GCS and may supply the scan pulse to the gate lines G1 to Gm corresponding to the predetermined order. The scan pulse supplied to each of the gate lines G1 to Gm may be synchronized with a data signal supplied to a corresponding data line. In an embodiment, in a process of manufacturing the TFT of each pixel P, the gate driver 314 may be embedded (or integrated) into one non-display area of the display panel 300 and may be connected to each of the plurality of gate lines G1 to Gm.

Similarly to the data driver 312, during the plurality of third touch sensing periods TT3 where the finger touch is sensed, the gate driver 314 may supply a gate load free signal to each of a plurality of gate lines G1 to Gm overlapping the touch electrode TE provided with the touch driving signal. The gate load free signal may be a signal having the same phase as that of the touch driving signal which is applied to the touch electrode TE during the plurality of third touch sensing periods TT3. As described above, the gate driver 314 may supply the gate load free signal, having the same phase as that of the touch driving signal, to the plurality of gate lines G1 to Gm overlapping the touch electrode TE provided with the touch driving signal, and thus, may decrease loads of touch electrodes TE caused by parasitic capacitances between the touch electrode TE and the gate lines G1 to Gm, thereby enhancing touch sensitivity.

The timing controller 316 may receive a timing synchronization signal TSS, such as a data enable signal, a reference clock signal, a vertical synchronization signal Vsync, and a horizontal synchronization signal, supplied from a host system (not shown) and may control driving of the data driver 312, the gate driver 314, and the touch sensing device 320 on the basis of the timing synchronization signal TSS. Particularly, the timing controller 316 may directly generate the touch synchronization signal Tsync or may receive the touch synchronization signal Tsync from the host system, and may time-divisionally drive one frame in the plurality of display periods DP1 to DPn and the plurality of touch sensing periods TP1 to TPn on the basis of the touch synchronization signal Tsync.

Moreover, the timing controller 316 may receive input data Idata supplied from the host system and align the input data Idata into pixel data R/G/B suitable for driving of the display panel 300 to provide aligned data to the data driver 312 in each of the plurality of display periods DP1 to DPn.

The timing controller 316 may generate and output the data control signal DCS and the gate control signal GCS on the basis of the timing synchronization signal TSS and the touch synchronization signal Tsync. Here, the data control signal DCS may include a source start signal, a source shift signal, a source enable signal, and a polarity control signal. Also, the gate control signal GCS may include at least one gate start signal and a plurality of gate shift clocks.

The touch sensing device 320 may sense a finger touch and a pen touch based on the active pen 220 through the touch electrodes TE during the first to third touch sensing periods TT1 to TT3 in response to the touch sensing periods TP1 to TPx of the touch synchronization signal Tsync input from the timing controller 316 or the host system.

Particularly, the touch sensing device 320 may sense a variation of a capacitance which occurs in the touch electrode TE due to the active pen 220 during the second touch sensing period T2, and thus, may simultaneously obtain pen data and pen touch coordinates. That is, unlike general touch sensing devices, the touch sensing device 320 according to the present invention may simultaneously sense the pen data and the pen touch coordinates during one touch sensing period TT2.

The reason that the touch sensing device 320 according to the present invention simultaneously senses the pen data and the pen touch coordinates during one touch sensing period TT2 is because, when the pen data and the pen touch coordinates are individually sensed through separate touch sensing periods, a touch sensing period increases inevitably in one frame, and due to this, a limitation occurs in increasing a display period, causing a problem where it is difficult to implement the active pen 220 in a high-resolution display apparatus.

Therefore, since the touch sensing device 320 according to the present invention simultaneously senses the pen data and the pen touch coordinates during one touch sensing period TT2, the touch sensing periods TP1 to TPx may be shortened in one frame, and the display periods DP1 to DPn may increase.

The touch sensing device 320 may calculate finger touch coordinates on the basis of a variation of a capacitance which occurs in the touch electrode TE due to a finger touch during the third touch sensing period TT3.

Hereinafter, a configuration of the touch sensing device according to the present invention will be described in more detail with reference to FIG. 4.

Figure 4:
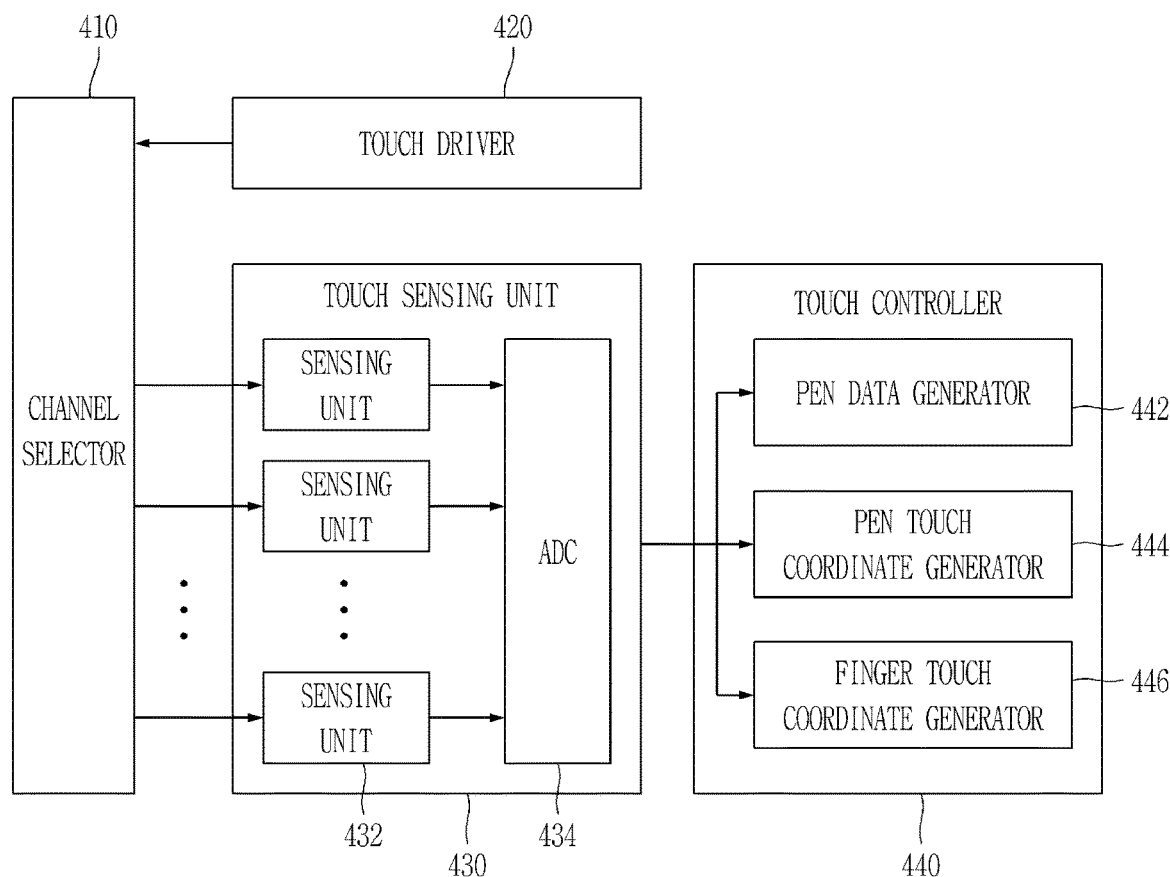
FIG. 4 is a block diagram schematically illustrating a configuration of the touch sensing device illustrated in FIG. 2.

FIG. 4 is a block diagram schematically illustrating a configuration of a touch sensing device according to an embodiment of the present invention. As illustrated in FIG. 4, the touch sensing device 320 may include a channel selector 410, a touch driver 420, a touch sensing unit 430, and a touch controller 440.

The channel selector 410 may be connected to a plurality of touch electrodes TE through a plurality of touch lines T1 to Tk. The channel selector 410 may supply the touch electrode TE with an uplink signal supplied from the touch driver 420 during a first touch sensing period TT1 and may supply the touch electrode TE with a touch driving signal supplied from the touch driver 420 during a third touch sensing period TT3.

Moreover, the channel selector 410 may connect the touch lines T1 to Tk to the touch sensing unit 430 during the second touch sensing period TT2 and the third touch sensing period TT3 so as to sense a capacitance generated by a touch based on the active pen 220 or a finger touch. To this end, the channel selector 410 may include a plurality of multiplexers (not shown) which are turned on based on a touch synchronization signal Tsync and a channel selection signal CSS and selectively connect the plurality of touch lines T1 to Tk to the touch sensing unit 430.

The channel selector 410 may provide a common voltage Vcom to the plurality of touch electrodes TE through the plurality of touch lines T1 to Tk during the display periods DP1 to DPn based on the touch synchronization signal Tsync.

The touch driver 420 may generate the uplink signal or the touch driving signal and may supply the generated uplink signal or touch driving signal to the touch electrode TE through each of the touch lines T1 to Tk connected to the channel selector 410.

In detail, during the first touch sensing period TT1 of the one frame period as illustrated in FIG. 3B, the touch driver 410 may generate the uplink signal and may supply the uplink signal to the touch electrode TE through each of the touch lines T1 to Tk, and during the plurality of third touch sensing periods TT3 of the one frame period, the touch driver 410 may generate the touch driving signal and may supply the touch driving signal to the touch electrode TE through each of the touch lines T1 to Tk.

In this case, the uplink signal may include panel information of the display panel 300, a protocol version, or a synchronization signal. Since the uplink signal is transferred to the active pen 220 through the touch electrode TE, the active pen 220 may check the panel information of the display panel 300 and protocol version and may be synchronized with a synchronization signal to generate a downlink signal.

In an embodiment, the touch driver 420 may generate the uplink signal or the touch driving signal by using a driving signal DS including a plurality of driving pulses which swing between a high voltage and a low voltage with respect to a reference common voltage.

The touch driver 420 may supply the common voltage Vcom to each of the plurality of touch electrodes TE through each of the plurality of touch lines T1 to Tk during the display periods DP1 to DPn based on the touch synchronization signal Tsync.

In FIG. 4, it has been described that the touch driver 420 directly inputs the uplink signal or the touch driving signal to the channel selector 410, but in a modified embodiment, the touch driver 420 may input the uplink signal or the touch driving signal to the channel selector 410 through the touch sensing unit 430.

During a second touch sensing period TT2 of a first frame illustrated in FIG. 3B, the touch sensing unit 430 may sense a touch based on the active pen 220 to generate first sensing data, and during a third touch sensing period TT3, may sense a finger touch to generate second sensing data.

To this end, as illustrated in FIG. 4, the touch sensing unit 430 according to the present invention may include a plurality of sensing units 432 and an analog-to-digital converter (ADC) 434.

Each of the sensing units 432 may receive and accumulate a capacitance generated based on the downlink signal transferred from the active pen 220 during the second touch sensing period TT2. In detail, the sensing unit 432 may be connected to the touch lines T1 to Tk through the channel selector 410 and may receive and accumulate a capacitance which is generated in the touch electrode TE connected to a corresponding touch line on the basis of the downlink signal received from the active pen 220.

In an embodiment, each of the sensing units 432 may divide the second touch sensing period TT2 into a plurality of unit periods and may accumulate, by units of unit periods, a capacitance received from a corresponding touch electrode TE on the basis of the downlink signal to generate first sensing data. In this case, a unit period may be defined as the predetermined number of pulses or a predetermined time length.

In such an embodiment, each of the sensing units 432 may determine a phase of the downlink signal which is received during a specific unit period in the second touch sensing period TT2, and based on the determined phase, may determine a direction in which a capacitance based on the downlink signal is accumulated.

In detail, when it is determined that the downlink signal having a first phase is received during a specific unit period, each of the sensing units 432 may accumulate a capacitance generated during a corresponding unit period in a positive direction from a base line to generate first sensing data.

On the other hand, when it is determined that the downlink signal having a second phase is received during a corresponding unit period, each of the sensing units 432 may accumulate a capacitance generated during the corresponding unit period in a negative direction from the base line to generate the first sensing data.

In this case, when a pulse of the downlink signal received during a corresponding unit period starts at a high level, each of the sensing units 432 may determine that the downlink signal in the corresponding unit period has the first phase, and when a pulse of the downlink signal received during a corresponding unit period starts at a low level, each of the sensing units 432 may determine that the downlink signal in the corresponding unit period has the second phase.

Each of the sensing units 432 may be connected to the touch lines T1 to Tk through the channel selector 410 during the third touch sensing period TT3 and may receive and accumulate a capacitance which is generated based on a finger touch on a touch electrode TE connected to a corresponding touch line, thereby generating second sensing data.

The sensing unit 432 may input, to the ADC 434, the first sensing data generated during the second touch sensing period TT2 and the second sensing data generated during the third touch sensing period TT3.

The ADC 434 may convert the first sensing data, generated by the plurality of sensing units 432 by units of unit periods during the second touch sensing period TT2, into a digital value to generate first touch raw data. Also, the ADC 434 may convert the second sensing data, generated during the third touch sensing period TT3, into a digital value to generate second touch raw data.

The ADC 434 may transfer the generated first and second touch raw data to the touch controller 440.

The touch controller 440 may generate pen data and pen touch coordinates of the active pen 220 on the basis of the first touch raw data generated by the ADC 434 during the second touch sensing period TT2. Also, the touch controller 440 may generate finger touch coordinates on the basis of the second touch raw data generated by the ADC 434 during the third touch sensing period TT3.

To this end, as illustrated in FIG. 4, the touch controller 440 may include a pen data generator 442, a pen touch coordinate generator 444, and a finger touch coordinate generator 446.

The pen data generator 442 may compare a predetermined reference value with the first touch raw data generated by the ADC 434 by units of unit periods of the second touch sensing period TT2, and thus, may convert the first touch raw data into one of a first value and a second value. In detail, when the first touch raw data is greater than a first reference value, the pen data generator 442 may convert the first touch raw data into the first value. For example, when the first touch raw data is greater than the first reference value, the pen data generator 442 may convert the first touch raw data into "1".

Moreover, when the first touch raw data is less than a second reference value, the pen data generator 442 may convert the first touch raw data into the second value. In this case, the second reference value may be set to a value which is less than the first reference value. For example, when the first touch raw data is less than the second reference value, the pen data generator 442 may convert the first touch raw data into "0".

Subsequently, the pen data generator 442 may sequentially arrange the first value or the second value generated by units of unit periods included in one second touch sensing period TT2 to generate one piece of binary data corresponding to the one second touch sensing period TT2 and may sequentially arrange binary data corresponding to all second touch sensing periods TT2 included in one frame to generate pen data. Accordingly, the pen data generated by the pen data generator 442 may be generated by units of one frame.

The pen data generator 442 may transmit the pen data, generated by units of one frame, to the host system.

The pen touch coordinate generator 444 may generate pen touch coordinates of the active pen 220 on the basis of the first touch raw data generated by units of unit periods of one second touch sensing period TT2. In detail, the pen touch coordinate generator 444 may calculate an increment by which the first touch raw data generated by units of unit periods of one second touch sensing period TT2 increases in the positive direction from the base line, or may calculate a decrement by which the first touch raw data decreases in the negative direction from the base line.

Subsequently, the pen touch coordinate generator 444 may determine, as pen touch strength, a result value obtained by summating all increments or decrements calculated in one second touch sensing period TT2. That is, the pen touch coordinate generator 444 may summate absolute values of result values obtained by subtracting a digital value, corresponding to the base line, from the first touch raw data generated by units of unit periods of the second touch sensing period TT2, thereby determining pen touch strength.

The pen touch coordinate generator 444 may calculate pen touch coordinates by using the determined pen touch strength. For example, the pen touch coordinate generator 444 may determine, as the pen touch coordinates, coordinates of a touch electrode TE where the calculated pen touch strength is greater than a threshold value.

In the above-described embodiment, the pen touch coordinate generator 444 may calculate pen touch coordinates in each of the second touch sensing periods TT2 included in one frame, and thus, the pen touch coordinates may be generated by units of second touch sensing periods TT2. The pen touch coordinate generator 444 may transmit the pen touch coordinates, generated by units of second touch sensing periods TT2, to the host system.

As described above, according to the present invention, pen data may be transmitted to the host system by units of frames (i.e., at a first report rate), but pen touch coordinates may be transmitted to the host system by units of second touch sensing periods TT2 (i.e., at a second report rate higher than the first report rate), thereby considerably enhancing pen touch sensing performance.

The finger touch coordinate generator 446 may generate finger touch coordinates on the basis of the second touch raw data generated during the third touch sensing period TT3. In detail, the finger touch coordinate generator 446 may compare the second touch raw data generated during the third touch sensing period TT3 with the predetermined reference value, and thus, may determine coordinates of a touch electrode TE, where the second touch raw data is greater than the reference value, as finger touch coordinates.

In the above-described embodiment, the pen touch coordinate generator 444 and the finger touch coordinate generator 446 have been described as separate elements, but this is merely an embodiment. In other embodiments, the pen touch coordinate generator 444 and the finger touch coordinate generator 446 may be implemented as one element.

In another embodiment, the pen data generator 442, the pen touch coordinate generator 444, and the finger touch coordinate generator 446 may be implemented as one element.

Hereinafter, a method of generating, by the touch sensing device 320 according to the present invention, pen data and pen touch coordinates from the downlink signal generated by the active pen 220 will be described with reference to FIG. 5 for example.

Figure 5:
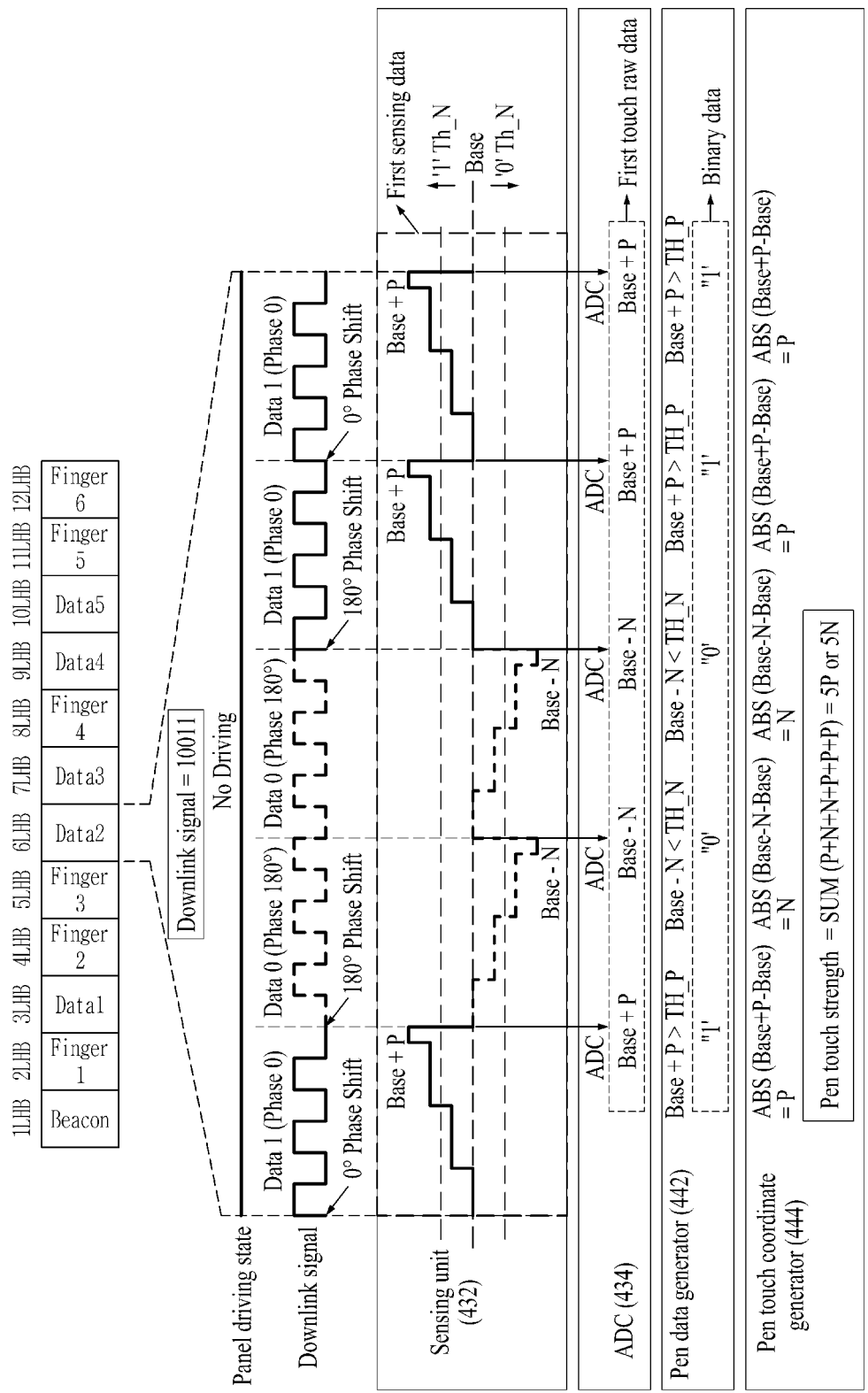
FIG. 5 is a diagram exemplarily illustrating a method of generating, by a touch sensing device according to the present invention, pen data and pen touch coordinates.

FIG. 5 is a diagram exemplarily illustrating a method of generating, by a touch sensing device according to the present invention, pen data and pen touch coordinates.

In an embodiment illustrated in FIG. 5, it may be assumed that downlink data, which is generated by the active pen 220 during the second touch sensing period TT2 and is received by a touch electrode TE, is "10011". As illustrated in FIG. 5, it may be seen that the display panel 330 maintains a non-driving state because the touch driving signal is not supplied from the touch sensing device 320 to the display panel 300 during the second touch sensing period TT2.

According to such an embodiment, since the active pen 220 modulates the downlink data by using the BPSK scheme or the DBPSK scheme and transmits modulated downlink data, as illustrated in FIG. 5, data "1" may be generated as a pulse waveform which starts at a high level and ends at a low level, so as to have the first phase (for example, 0 degrees). Also, as illustrated in FIG. 5, data "0" may be generated as a pulse waveform which starts at a low level and ends at a high level, so at to have the second phase (for example, 180 degrees).

The sensing unit 432, as illustrated in FIG. 5, may accumulate a capacitance generated based on the downlink signal applied to a corresponding touch electrode TE at every predetermined unit period. According to such an embodiment, since the downlink signal in a first unit period UP1 of the second touch sensing period TT2 starts at a high level and ends at a low level, the sensing unit 432 may determine that the downlink signal has the first phase and may accumulate a capacitance based on a corresponding downlink signal in a positive direction D1 from a base line (Base) to generate first sensing data (Base+P).

Moreover, since the downlink signal in a second unit period UP2 of the second touch sensing period TT2 starts at a low level and ends at a high level, the sensing unit 432 may determine that a phase of the downlink signal is shifted from the first phase to the second phase and may accumulate a capacitance based on a corresponding downlink signal in a negative direction D2 from the base line (Base) to generate first sensing data (Base-N).

Moreover, since the downlink signal in a third unit period UP3 of the second touch sensing period TT2 starts at a low level and ends at a high level, the sensing unit 432 may determine that a phase of the downlink signal is not shifted and may accumulate a capacitance based on a corresponding downlink signal in the negative direction D2 from the base line (Base) to generate the first sensing data (Base-N).

Moreover, since the downlink signal in a fourth unit period UP4 of the second touch sensing period TT2 starts at a high level and ends at a low level, the sensing unit 432 may determine that a phase of the downlink signal is shifted from the second phase to the first phase and may accumulate a capacitance based on a corresponding downlink signal in the positive direction D1 from the base line (Base) to generate the first sensing data (Base+P).

Moreover, since the downlink signal in a fifth unit period UP5 of the second touch sensing period TT2 starts at a high level and ends at a low level, the sensing unit 432 may determine that a phase of the downlink signal is not shifted and may accumulate a capacitance based on a corresponding downlink signal in the positive direction D1 from the base line (Base) to generate the first sensing data (Base+P).

Subsequently, the ADC 434 may convert first sensing data, generated by the sensing unit 432 by units of unit periods, into a digital value to generate the first touch raw data by units of unit periods. Accordingly, the first sensing data generated in each of the first to fifth unit periods UP1 to UP5 may be converted into the first touch raw data.

Subsequently, the pen data generator 442 may compare the first touch raw data with the first reference value and the second reference value, and thus, may convert the first touch raw data into the first value or the second value. In detail, the first touch raw data generated in the first unit period UP1 may be greater than a first reference value TH_P, the pen data generator 442 may convert the first touch raw data, generated in the first unit period UP1, into "1" which is the first value.

Moreover, the first touch raw data generated in the second unit period UP2 may be less than a second reference value TH_N, the pen data generator 442 may convert the first touch raw data, generated in the second unit period UP2, into "0" which is the second value.

Moreover, the first touch raw data generated in the third unit period UP3 may be less than the second reference value TH_N, the pen data generator 442 may convert the first touch raw data, generated in the third unit period UP3, into "0" which is the second value.

Moreover, the first touch raw data generated in the fourth unit period UP4 may be greater than the first reference value TH_P, the pen data generator 442 may convert the first touch raw data, generated in the fourth unit period UP4, into "1" which is the first value.

Moreover, the first touch raw data generated in the fifth unit period UP5 may be greater than the first reference value TH_P, the pen data generator 442 may convert the first touch raw data, generated in the fifth unit period UP5, into "1" which is the first value.

Therefore, the pen data generator 442 may sequentially arrange five values generated in one second touch sensing period TT2 to generate binary data "10011". The pen data generator 442 may repeat the same operations on all second touch sensing periods TT2 included in one frame to generate binary data by units of second touch sensing periods TT2 and may arrange the generated binary data in a time order to generate pen data. Accordingly, generating of the pen data by units of one frame may be completed.

The pen touch coordinate generator 444 may summate absolute values of result values obtained by subtracting a digital value, corresponding to the base line, from the first touch raw data generated by units of unit periods of the second touch sensing period TT2, thereby determining pen touch strength.

In detail, as seen in FIG. 5, when an absolute value is set by subtracting a digital value corresponding to the base line from the first touch raw data generated in the first unit period UP1, a value corresponding to "P" may be calculated. Also, when an absolute value is set by subtracting a digital value corresponding to the base line from the first touch raw data generated in the second unit period UP2, a value corresponding to "N" may be calculated. Also, when an absolute value is set by subtracting a digital value corresponding to the base line from the first touch raw data generated in the third unit period UP3, a value corresponding to "N" may be calculated. Also, when an absolute value is set by subtracting a digital value corresponding to the base line from the first touch raw data generated in the fourth unit period UP4, a value corresponding to "P" may be calculated. Also, when an absolute value is set by subtracting a digital value corresponding to the base line from the first touch raw data generated in the fifth unit period UP5, a value corresponding to "P" may be calculated.

When a value corresponding to "P" is the same as a value corresponding to "N", the pen touch coordinate generator 444 may summate all values calculated in the first to fifth unit periods UP1 to UP5 to calculate a value corresponding to "5P" or "5N" as pen touch strength and may determine pen touch coordinates on the basis of the calculated pen touch strength.

Therefore, generating of the pen touch coordinates by units of second touch sensing periods may be completed.

According to the present invention, pen data and pen touch coordinates of an active pen may be simultaneously sensed in one touch sensing period, and thus, a touch sensing period may decrease in one frame, thereby increasing a display period.

Moreover, according to the present invention, the display period may increase in one frame, and thus, the active pen may be applied to a high-resolution display apparatus.

It may be understood that those skilled in the art may implement the present invention in another detailed form without changing the technical spirit or essential feature of the present invention.

For example, in the above-described embodiments, the display apparatus has been described as an LCD apparatus, but is not limited thereto and may use all display apparatuses with integrated touch screen, in addition to organic light emitting display apparatuses.

Moreover, the touch sensing device illustrated in FIG. 4 may be implemented as an IC type, and a function of the touch sensing device may be implemented as a program and may be installed in an IC. When a function of the touch sensing device according to the present invention is implemented as a program, a function of each of the elements illustrated in FIG. 4 may be implemented as a specific code, and codes for implementing a specific function may be implemented as one program or may be divided into a plurality of programs.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A touch sensing device for implementing a high resolution, the touch sensing device comprising:
    a touch driver configured to transmit an uplink signal to an active pen through a touch electrode provided in a display panel during a first touch sensing period included in one frame period;
    a touch sensing circuit configured to sense a downlink signal transmitted from the active pen on the basis of a capacitance occurring between the active pen and the touch electrode to generate first sensing data during a plurality of second touch sensing periods included in the one frame period; and
    a touch control circuit configured to calculate pen data and pen touch coordinates of the active pen on the basis of the first sensing data generated during the second touch sensing period,
    wherein the touch control circuit is configured to calculate both the pen data and the pen touch coordinates using the first sensing data generated by sensing a variation of the capacitance occurred due to the downlink signal,
    wherein the downlink signal comprises at least one of pen pressure information, pen slope information, button state information, and removing information, and does not comprise information for obtaining the pen touch coordinates, and
    wherein, during the second touch sensing period, the display panel is maintained in a non-driving state where the uplink signal and a touch driving signal are not supplied thereto.

2. The touch sensing device of claim 1, wherein the touch sensing circuit comprises:
    a sensing circuit configured to accumulate, by units of predetermined unit periods, a capacitance based on the downlink signal received during the second touch sensing period to generate the first sensing data by units of unit periods; and
    an analog-to-digital converter (ADC) configured to convert the first sensing data, generated by units of unit periods, into a digital value to generate touch raw data.

3. The touch sensing device of claim 2, wherein
    when a first-phase downlink signal is received during the unit period, the sensing circuit is configured to accumulate a capacitance generated during the unit period in a positive direction from a base line to generate the first sensing data, and
    when a second-phase downlink signal is received during the unit period, the sensing circuit is configured to accumulate a capacitance generated during the unit period in a negative direction from the base line to generate the first sensing data.

4. The touch sensing device of claim 2, wherein
    the touch control circuit comprises a pen data generator configured to convert touch raw data, which is greater than a first reference value, into a first value and convert touch raw data, which is less than a second reference value, into a second value, thereby generating the pen data, and
    the second reference value is less than the first reference value.

5. The touch sensing device of claim 4, wherein the pen data generation circuit is configured to sequentially arrange the first value and the second value generated by units of unit periods included in one second touch sensing period to generate binary data, and sequentially arrange the binary data generated in each of the plurality of second touch sensing periods to generate the pen data by units of frames.

6. The touch sensing device of claim 2, wherein the touch control circuit comprises a pen touch coordinate generation circuit configured to generate the pen touch coordinates on the basis of a result value obtained by summating increments in a positive direction from a base line or decrements in a negative direction from the base line during each of the unit periods by unis of second touch sensing periods.

7. The touch sensing device of claim 1, wherein the downlink signal is transmitted from the active pen in synchronization with the uplink signal.

8. The touch sensing device of claim 1, wherein
    the touch driver is configured to supply the touch driving signal to the touch electrode, for sensing a finger touch during a plurality of third touch sensing periods included in the one frame period,
    the touch sensing circuit is configured to sense a capacitance generated between the finger and the touch electrode to generate second sensing data during the third touch sensing period, and
    the touch control circuit is configured to calculate finger touch coordinates on the basis of the second sensing data.

9. The touch sensing device of claim 1, wherein the downlink signal is a signal which is generated through a binary phase shift keying (BPSK) modulation or a differential binary phase shift keying (DBPSK) modulation.

10. The touch sensing device of claim 1, wherein the pen data comprises at least one of pen pressure information, pen slope information, button state information, removing information, and pen identification information about the active pen.

11. The touch sensing device of claim 1, wherein the touch control circuit is configured to transmit the pen data to a host system at a first report rate and transmit the pen touch coordinates to the host system at a second report rate which is higher than the first report rate.

12. A display apparatus comprising:
 a display panel including a plurality of touch electrodes; and
 a touch sensing integrated circuit configured to transmit an uplink signal to an active pen through at least one of the touch electrodes during a first touch sensing period included in one frame period and sense a downlink signal transmitted from the active pen on the basis of a capacitance generated between the active pen and the touch electrode to generate first sensing data during a plurality of second touch sensing periods included in the one frame period,
 wherein the touch sensing integrated circuit is configured to calculate both the pen data and the pen touch coordinates using the first sensing data generated by sensing a variation of the capacitance occurred due to the downlink signal,
 wherein the downlink signal comprises at least one of pen pressure information, pen slope information, button state information, and removing information, and does not comprise information for obtaining the pen touch coordinates, and
 wherein, during the second touch sensing period, the display panel is maintained in a non-driving state where the uplink signal and a touch driving signal are not supplied thereto.

13. The display apparatus of claim 12, wherein the touch sensing integrated circuit is configured to accumulate, by units of predetermined unit periods, a capacitance based on the downlink signal received during the second touch sensing period to generate the first sensing data by units of unit periods, and calculate the pen data and the pen touch coordinates of the active pen on the basis of touch raw data generated by converting the first sensing data into a digital value.

14. The display apparatus of claim 13, wherein,
 when a first-phase downlink signal is received during the unit period, the touch sensing integrated circuit is configured to accumulate a capacitance generated during the unit period in a positive direction from a base line to generate the first sensing data, and
 when a second-phase downlink signal is received during the unit period, the touch sensing integrated circuit is configured to accumulate a capacitance generated during the unit period in a negative direction from the base line to generate the first sensing data.

15. The display apparatus of claim 13, wherein, when the touch raw data generated by units of unit periods is greater than a first reference value, the touch sensing integrated circuit is configured to convert the touch raw data into a first value, and when the touch raw data generated by units of unit periods is less than a second reference value which is less than the first reference value, the touch sensing device is configured to convert the touch raw data into a second value, thereby generating the pen data.

16. The display apparatus of claim 15, wherein the touch sensing integrated circuit is configured to sequentially arrange the first value and the second value generated by units of unit periods included in one second touch sensing period to generate binary data and sequentially arrange the binary data generated in each of the plurality of second touch sensing periods to generate the pen data by units of frames.

17. The display apparatus of claim 15, wherein the touch sensing integrated circuit is configured to generate the pen touch coordinates on the basis of a result value obtained by summating increments in a positive direction from a base line or decrements in a negative direction from the base line during each of the unit periods by unis of second touch sensing periods.

18. The display apparatus of claim 15, wherein the touch sensing integrated circuit is configured to supply the touch driving signal to the touch electrode, for sensing a finger touch during a plurality of third touch sensing periods included in the one frame period, and calculate finger touch coordinates on the basis of second sensing data generated by sensing a capacitance generated between the finger and the touch electrode during the third touch sensing period.

19. The display apparatus of claim 13, wherein the touch sensing integrated circuit is configured to transmit the pen data to a host system at a first report rate and transmit the pen touch coordinates to the host system at a second report rate which is higher than the first report rate.

\* \* \* \* \*